United States Patent
Watson et al.

(10) Patent No.: US 9,191,465 B2
(45) Date of Patent: Nov. 17, 2015

(54) MULTI-CDN DIGITAL CONTENT STREAMING

(71) Applicant: Netflix, Inc., Los Gatos, CA (US)

(72) Inventors: Mark Watson, San Francisco, CA (US); Bin Wang, Fremont, CA (US); Wei Wei, Fremont, CA (US)

(73) Assignee: NETFLIX INC., Los Gatos, CA (US)

( * ) Notice: Subject to any disclaimer, the term of this patent is extended or adjusted under 35 U.S.C. 154(b) by 401 days.

(21) Appl. No.: 13/683,883

(22) Filed: Nov. 21, 2012

(65) Prior Publication Data

US 2014/0143301 A1 May 22, 2014

(51) Int. Cl.
*H04L 29/06* (2006.01)

(52) U.S. Cl.
CPC ............ *H04L 69/14* (2013.01); *H04L 65/4084* (2013.01); *H04L 65/80* (2013.01)

(58) Field of Classification Search
CPC ... H04L 65/80; H04L 65/604; H04L 65/4084; H04L 29/06; H04N 21/2662
USPC ............ 705/51; 709/203, 221, 223, 227, 231; 725/12; 726/27
See application file for complete search history.

(56) References Cited

U.S. PATENT DOCUMENTS

| 7,765,307 | B1 | 7/2010 | Kritov et al. |
| 7,925,771 | B1 | 4/2011 | Ping et al. |
| 2002/0065922 | A1 | 5/2002 | Shastri |
| 2007/0260546 | A1 | 11/2007 | Batalden et al. |
| 2010/0094971 | A1 | 4/2010 | Zuckerman et al. |
| 2010/0281142 | A1* | 11/2010 | Stoyanov ...................... 709/221 |
| 2011/0225302 | A1* | 9/2011 | Park et al. .................... 709/227 |
| 2014/0143431 | A1* | 5/2014 | Watson et al. ................ 709/227 |

OTHER PUBLICATIONS

Office Action dated Jan. 29, 2015 for U.S. Appl. No. 13/683,578.

* cited by examiner

*Primary Examiner* — Kevin Bates
*Assistant Examiner* — Chen-Liang Huang
(74) *Attorney, Agent, or Firm* — Artegis Law Group, LLP

(57) ABSTRACT

Techniques for transmitting a digital content stream through a network between a plurality of content servers and a content player. Network performance information for the plurality of content servers is retrieved. Embodiments then determine a mapping of the plurality of content servers to a plurality of portions of a content buffer on the content player, based on the retrieved network performance information. A request is transmitted to each of the plurality of content servers to transmit digital content associated with the corresponding portion of the content buffer.

18 Claims, 6 Drawing Sheets

MULTI-CDN DIGITAL CONTENT STREAMING

BACKGROUND OF THE INVENTION

1. Field of Invention

Embodiments of the present invention relate generally to digital content delivery techniques and, more specifically, to the use of parallel network connections to transmit a digital content stream.

2. Description of Related Art

Streaming digital content (e.g., video content) is an increasingly popular method of delivering entertainment content to users. Frequently, a digital content stream is transmitted to an end point device over a single network connection. In some circumstances, the rate at which the digital content stream can be transmitted over the single network connection may be negatively affected by poor network conditions, causing the playback of the digital content stream on the end point device to be delayed or even prevented. Additionally, it is generally preferable to maximize the network throughput in streaming digital content, as doing so can enable the streaming of higher quality content.

SUMMARY OF THE INVENTION

One embodiment of the invention disclosed herein provides a method for transmitting a digital content stream through a network between a plurality of content servers and a content player. The method includes retrieving network performance information for the plurality of content servers. The method also includes determining a mapping of the plurality of content servers to a plurality of portions of a content buffer on the content player, based on the retrieved network performance information. Additionally, the method includes transmitting a request to each of the plurality of content servers to transmit digital content associated with the corresponding portion of the content buffer.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
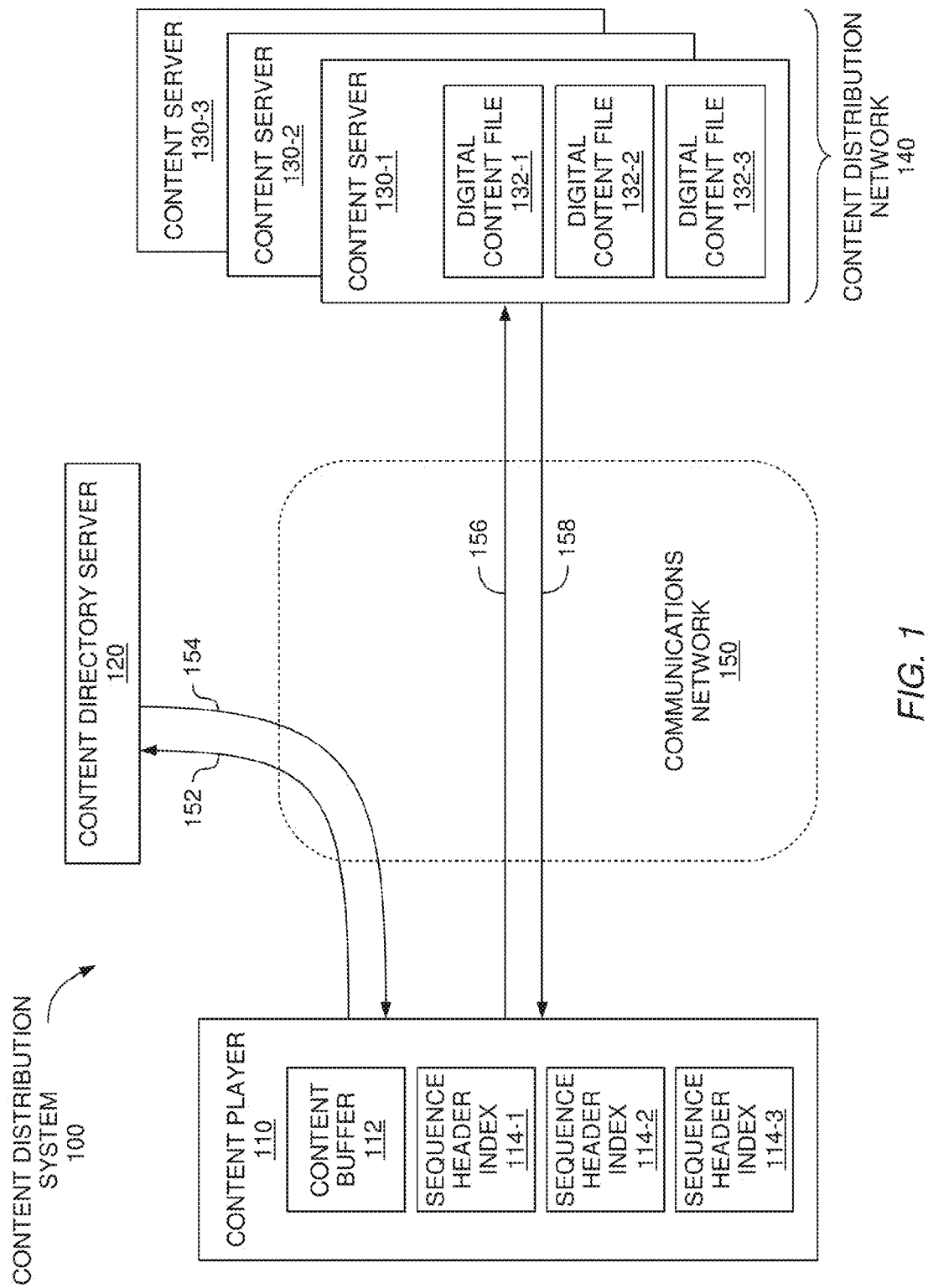
FIG. 1 illustrates a content distribution system configured to implement one or more aspects described herein.

Generally speaking, it is preferable to transmit a digital content stream at as high a transmission rate as possible, as the transmission rate of streaming digital content correlates to the quality of the streaming digital content. Additionally, content streaming systems often establish only a single network connection with content server. However, streaming techniques using only a single network connection may be unable to maximize network throughput and to take advantage of available network bandwidth. For instance, if the network connecting the content player and the content server is experiencing problems (e.g., packet loss) or is operating under a heavy workload, the playback of the digital content stream on the content player device may be delayed or even prevented. Additionally, some network protocols are capable of achieving a greater total network throughput when multiple network connections are established, relative to the use of a single network connection.

Accordingly, embodiments provide techniques for transmitting a digital content stream through a network between a plurality of content servers and a content player. Such a content player may be configured to retrieve network performance information for the plurality of content servers. For instance, network performance information could include historical performance information for the content servers such as a measure of network throughput for a content server, network bandwidth for the content server, network throughput variance for the content server, average latency of the content server, historical availability of the content server and services supported by the content server.

Embodiments determine a mapping of the plurality of content servers to a plurality of portions of a content buffer on the content player, based on the retrieved network performance information. Here, the portions of the content buffer are portions that have not yet been downloaded from a content server. For instance, a streaming manager on the content player could divide the content buffer on the content player into the plurality of portions and, for each of the plurality of portions of the content buffer, could determining a size of the portion based on the retrieved network performance information for the corresponding content server. In one embodiment, content servers with a slower network performance, as indicated by the network performance information, are mapped to later portions of the content buffer. Conversely, content servers with a faster network performance, as indicated by the network performance information, are mapped to earlier portions of the content buffer.

Additionally, the streaming manager on the content player may transmit a request to each of the plurality of content servers to transmit digital content associated with the corresponding portion of the content buffer. Advantageously, doing so enables content player devices to stream digital content simultaneously in parallel from a plurality of different content servers, which in turn may help to maximize the network throughput of the streaming and thereby help to improve the quality of the streaming content (i.e., by streaming a higher quality encoding of the digital content using the increased network throughput). Additionally, by mapping later portions of the content buffer to slower content servers and earlier portions of the content buffer to faster content servers, embodiments may effectively utilize a variety of different content servers of various capabilities.

Another embodiment provides techniques for optimizing a plurality of parallel network connections for a digital content stream through a network between a plurality of content servers and a content player. The streaming manager could determine an indication of network performance for each of the plurality of parallel network connections. Additionally, embodiments could determine whether a first one the plurality of parallel network connections is underperforming, based on whether the indication of network performance associated with the first parallel network connection exceeds a threshold value of performance. Upon determining that the first parallel network connection is underperforming, embodiments may drop the first parallel network connection. Additionally, the content player could also be configured to add a new network connection to a content server under certain circumstances. For instance, in one embodiment, the content player is configured to add a new network connection upon determining that a total network throughput is less than a threshold amount of throughput. Advantageously, doing so helps to optimize the number of parallel network connections used by the content player for streaming digital content.

FIG. 1 illustrates a content distribution system 100 configured to implement one or more aspects of the present invention. As shown, the content distribution system 100 includes, without limitation, a content player 110, one or more content servers 130, and a communications network 150. The content distribution system 100 may also include a content directory server 120. In one embodiment, the one or more content servers 130 comprise a content distribution network (CDN) 140.

The communications network 150 includes a plurality of network communications systems, such as routers and switches, configured to facilitate data communication between the content player 110 and the one or more content servers 130. Persons skilled in the art will recognize that many technically feasible techniques exist for building the communications network 150, including technologies practiced in deploying the well-known internet communications network. A network connection may broadly refer to a communications channel between two devices that are connected to the communications network 150.

The content directory server 120 comprises a computer system configured to receive a title lookup request 152 and generate file location data 154. The title lookup request 152 includes, without limitation, a name of a movie or song requested by a user. The content directory server 120 queries a database (not shown) that maps a video stream of a given title encoded at a particular playback bit rate to a digital content file 132, residing within an associated content server 130. The file location data 154 includes, without limitation, a reference to a content server 130 that is configured to provide the digital content file 132 to the content player 110 (e.g., through one or more network connections). Multiple content servers 130 (e.g., content server 130-1, content server 130-2, content server 130-3, etc.) may each have a copy of the digital content file 132 and may each be configured to provide the portions of the file simultaneously to the same content player 110 using the communications network 150.

The content server 130 is a computer system configured to serve download requests for digital content files 132 from the content player 110. The digital content files may reside on a mass storage system accessible to the computer system. The mass storage system may include, without limitation, direct attached storage, network attached file storage, or network attached block-level storage. The digital content files 132 may be formatted and stored on the mass storage system using any technically feasible technique. A data transfer protocol, such as the well-known hyper-text transfer protocol (HTTP), may be used to download digital content files 132 from the content server 130 to the content player 110.

Each title (e.g., a movie, song, or other form of digital media) is associated with one or more digital content files 132. Each digital content file 132 comprises, without limitation, a sequence header index 114, audio data and an encoded sequence. An encoded sequence comprises a complete version of the video data corresponding title encoded to a particular playback bit rate. For example, a given title may be associated with digital content file 132-1, digital content file 132-2, and digital content file 132-3. Digital content file 132-1 may comprise sequence header index 114-1 and an encoded sequence encoded to an average playback bit rate of approximately 250 kilobits per second (Kbps). Digital content file 132-2 may comprise sequence header index 114-2 and an encoded sequence encoded to an average playback bit rate of approximately 1000 Kbps. Similarly, digital content file 132-3 may comprise sequence header index 114-3 and an encoded sequence encoded to an average playback bit rate of approximately 1500 Kbps. The 1500 Kbps encoded sequence enables higher quality playback and is therefore more desirable for playback versus the 250 Kbps encoded sequence. Given that multiple content servers 130 (e.g., content server 130-1, content server 130-2, content server 130-3, etc.) may each have a copy of the digital content file 132, each of the multiple content servers 130 may therefore have the digital content file 132-1, digital content file 132-2, and digital content file 132-3, etc.

An encoded sequence within a digital content file 132 is organized as units of video data representing a fixed span of playback time. Overall playback time is organized into sequential time slots, each corresponding to one fixed span of playback time. For a given time slot, one unit of video data is represented within the digital content file 132 for the playback bit rate associated with the digital content file 132. Because variable bit rate encoding may be used, each unit of video data may be variable in size, despite a direct correspondence to the fixed span of playback time. For the above example, each time slot within the digital content file 132-1 comprising an encoded sequence encoded to a playback bit rate of 1500 Kbps would include a unit of video data encoded at 1500 Kbps. In one embodiment, units of audio data are encoded at a fixed bit rate for each time slot and stored in the digital content file 132.

The units of video data and units of audio data are configured to provide time-synchronized playback, beginning at the start of each time slot. To avoid starving either audio playback or video playback, units of audio data and units of video data are downloaded in a generally alternating pattern to assure that the audio buffer 244 and video buffer 246 store comparable durations of playback time each.

Persons skilled in the art will readily recognize that each encoded sequence, as defined above, comprises a digital content "stream." Furthermore, the process of downloading a particular encoded sequence from the content server 130 to the content player 110 comprises "streaming" the digital content to the content player 110 for playback at a particular playback bit rate.

The content player 110 may comprise a computer system, a set top box, a mobile device such as a mobile phone, or any other technically feasible computing platform that has network connectivity and is coupled to or includes a display device and speaker device for presenting video frames, and generating acoustic output, respectively. As described in greater detail below, the content player 110 is configured to download a unit of video data for a selected bit rate, and adapt the selected bit rate for subsequently downloaded units of video data based on prevailing bandwidth conditions within the communications network 150.

As available bandwidth within the communications network 150 becomes limited, the content player may select a lower bit rate encoding for units of video data that have not yet been downloaded corresponding to subsequent time slots. As available bandwidth increases, a higher bit rate encoding may be selected.

Although, in the above description, the content distribution system 100 is shown with one content player 110 and one CDN 140, persons skilled in the art will recognize that the architecture of FIG. 1 contemplates only an exemplary embodiment of the invention. Other embodiments may include any number of content players 110 and/or CDNs 140. Thus, FIG. 1 is in no way intended to limit the scope of the present invention in any way.

Generally, the content player 110 (or an application executing on the content player 110) may be configured to determine a mapping of the plurality of content servers to a plurality of portions of the content buffer 112, based on network performance information characterizing the streaming performance of the plurality of content servers $130_{1-3}$ (e.g., based on previous digital content streams between the content player and the content servers $130_{1-3}$). For instance, the content player 110 could divide the content buffer 112 into the plurality of portions and, for each of the plurality of portions of the content buffer, could determining a size of the portion based on the retrieved network performance information for the corresponding content server. In one embodiment, the content buffer is divided into portions such that content servers $130_{1-3}$ having a slower network performance, as indicated by the network performance information, are mapped to later portions of the content buffer 112, and content servers with a faster network performance, as indicated by the network performance information, are mapped to earlier portions of the content buffer 112.

Additionally, the content player 110 may transmit a request to each of the plurality of content servers $130_{1-3}$ to transmit digital content associated with the corresponding portion of the content buffer (e.g., a portion of the digital content file 132-1. Doing so allows the content player 110 to stream digital content simultaneously from a plurality of different content servers $130_{1-3}$, which may maximize the network throughput of the streaming and improve the quality of the streaming content (e.g., by streaming a higher quality encoding of the digital content using the increased network throughput). Additionally, by mapping later portions of the content buffer to slower content servers and earlier portions of the content buffer to faster content servers, embodiments may effectively use a variety of different content servers.

Another embodiment provides techniques for optimizing a plurality of parallel network connections for a digital content stream through a network between a plurality of content servers and a content player. In such an embodiment, the content player 110 (or an application executing on the content player 110) may determine an indication of network performance for each of the plurality of parallel network connections. Additionally, the content player 110 could determine whether a first one the plurality of parallel network connections is underperforming, based on whether the indication of network performance associated with the first parallel network connection exceeds a threshold value of performance. Upon determining that the first parallel network connection is underperforming, the content player 110 could drop the first parallel network connection. Additionally, the content player could also be configured to add a new network connection to a content server under certain circumstances. For instance, in one embodiment, the content player 110 is configured to add a new network connection upon determining that a total network throughput is less than a threshold amount of throughput. Advantageously, doing so helps to optimize the number of parallel network connections used by the content player for streaming digital content.

Figure 2:
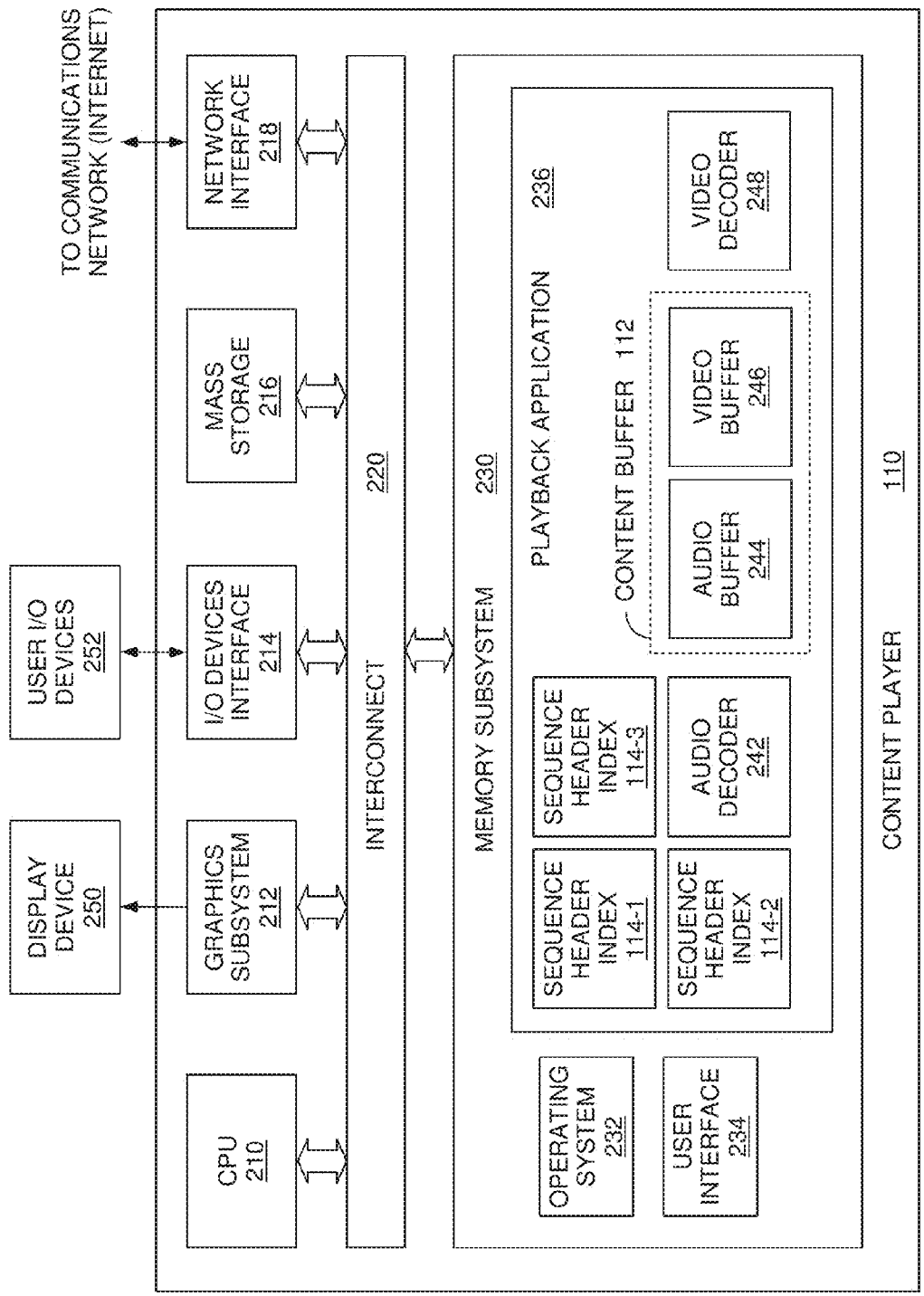
FIG. 2 is a more detailed view of the content player of FIG. 1, according to one embodiment described herein.

FIG. 2 is a more detailed view of the content player 110 of FIG. 1, according to one embodiment of the invention. As shown, the content player 110 includes, without limitation, a central processing unit (CPU) 210, a graphics subsystem 212, an input/output (I/O) device interface 214, a network interface 218, an interconnect 220, and a memory subsystem 230. The content player 110 may also include a mass storage unit 216.

The CPU 210 is configured to retrieve and execute programming instructions stored in the memory subsystem 230. Similarly, the CPU 210 is configured to store and retrieve application data residing in the memory subsystem 230. The interconnect 220 is configured to facilitate transmission of data, such as programming instructions and application data, between the CPU 210, graphics subsystem 212, I/O devices interface 214, mass storage 216, network interface 218, and memory subsystem 230.

The graphics subsystem 212 is configured to generate frames of video data and transmit the frames of video data to display device 250. In one embodiment, the graphics subsystem 212 may be integrated into an integrated circuit, along with the CPU 210. The display device 250 may comprise any technically feasible means for generating an image for display. For example, the display device 250 may be fabricated using liquid crystal display (LCD) technology, cathode-ray technology, and light-emitting diode (LED) display technology (either organic or inorganic). An input/output (I/O) device interface 214 is configured to receive input data from user I/O devices 252 and transmit the input data to the CPU 210 via the interconnect 220. For example, user I/O devices 252 may comprise one of more buttons, a keyboard, and a mouse or other pointing device. The I/O device interface 214 also includes an audio output unit configured to generate an electrical audio output signal. User I/O devices 252 includes a speaker configured to generate an acoustic output in response to the electrical audio output signal. In alternative embodiments, the display device 250 may include the speaker. A television is an example of a device known in the art that can display video frames and generate an acoustic output. A mass storage unit 216, such as a hard disk drive or flash memory storage drive, is configured to store non-volatile data. A network interface 218 is configured to transmit and receive packets of data via the communications network 150. In one embodiment, the network interface 218 is configured to communicate using the well-known Ethernet standard. The network interface 218 is coupled to the CPU 210 via the interconnect 220.

The memory subsystem 230 includes programming instructions and data that comprise an operating system 232, user interface 234, and playback application 236. The operating system 232 performs system management functions such as managing hardware devices including the network interface 218, mass storage unit 216, I/O device interface 214, and graphics subsystem 212. The operating system 232 also provides process and memory management models for the user interface 234 and the playback application 236. The user interface 234 provides a specific structure, such as a window and object metaphor, for user interaction with content player 110. Persons skilled in the art will recognize the various operating systems and user interfaces that are well-known in the art and suitable for incorporation into the content player 110.

The playback application 236 is configured to retrieve a digital content file 132 from one or more of the content servers 130 via the network interface 218 and play the digital content file 132 through the graphics subsystem 212. The graphics subsystem 212 is configured to transmit a rendered video signal to the display device 250. In normal operation, the playback application 236 receives a request from a user to play a specific title. The playback application 236 then locates the digital content files 132 associated with the requested title, where each digital content file 132 associated with the requested title includes an encoded sequence encoded to a different playback bit rate. In one embodiment, the playback application 236 locates the digital content files 132 by posting title lookup request 152 to the content directory server 120. The content directory server 120 replies to the title lookup request 152 with file location data 154 for each digital content file 132 associated with the requested title. Each file location data 154 includes a reference to the associated content server 130, in which the requested digital content file 132 resides. The title lookup request 152 may include the name of the requested title, or other identifying information with respect to the title. After the playback application 236 has located the digital content files 132 associated with the requested title, the playback application 236 downloads sequence header indices 114 associated with each digital content file 132 associated with the requested title from the content server 130.

In one embodiment, the playback application 236 begins downloading the digital content file 132 associated with the requested title comprising the encoded sequence encoded to the lowest playback bit rate to minimize startup time for playback. For the purposes of discussion, the digital content file 132-1 is associated with the requested title and comprises the encoded sequence encoded to the lowest playback bit rate. The requested digital content file 132-1 is downloaded into the content buffer 112, configured to serve as a first-in, first-out queue. In one embodiment, each unit of downloaded data comprises a unit of video data or a unit of audio data. As units of video data associated with the requested digital content file 132-1 are downloaded to the content player 110, the units of video data are pushed into the content buffer 112. Similarly, as units of audio data associated with the requested digital content file 132-1 are downloaded to the content player 110, the units of audio data are pushed into the content buffer 112. In one embodiment the units of video data are stored in video buffer 246 within the content buffer 112, and units of audio data are stored in audio buffer 224, also within the content buffer 112.

A video decoder 248 reads units of video data from the video buffer 246, and renders the units of video data into a sequence of video frames corresponding in duration to the fixed span of playback time. Reading a unit of video data from the video buffer 246 effectively de-queues the unit of video data from the video buffer 246 (and from the content buffer 112). The sequence of video frames is processed by graphics subsystem 212 and transmitted to the display device 250.

An audio decoder 242 reads units of audio data from the audio buffer 244, and renders the units of audio data into a sequence of audio samples, generally synchronized in time with the sequence of video frames. In one embodiment, the sequence of audio samples is transmitted to the I/O device interface 214, which converts the sequence of audio samples into the electrical audio signal. The electrical audio signal is transmitted to the speaker within the user I/O devices 252, which, in response, generates an acoustic output.

When playback is initiated, the playback application 236 requests units of video data encoded to the lowest available bit rate, thereby minimizing start time perceived by a user. However, as bandwidth conditions within the communications network 150 allow, the playback application 236 may request units of video data encoded to higher bit rates, thereby improving playback quality over time, without introducing a startup delay commensurate with the highest level of playback quality ultimately achieved by the playback application 236. If bandwidth conditions within the communications network 150 deteriorate during playback, then the playback application 236 may request subsequent units of video data encoded to a lower bit rate. In one embodiment, the playback application 236 determines which encoded bit rate should be used for each sequential download of a unit of video data based on a bandwidth estimate calculated over one or more recently downloaded units of video data.

Figure 3:
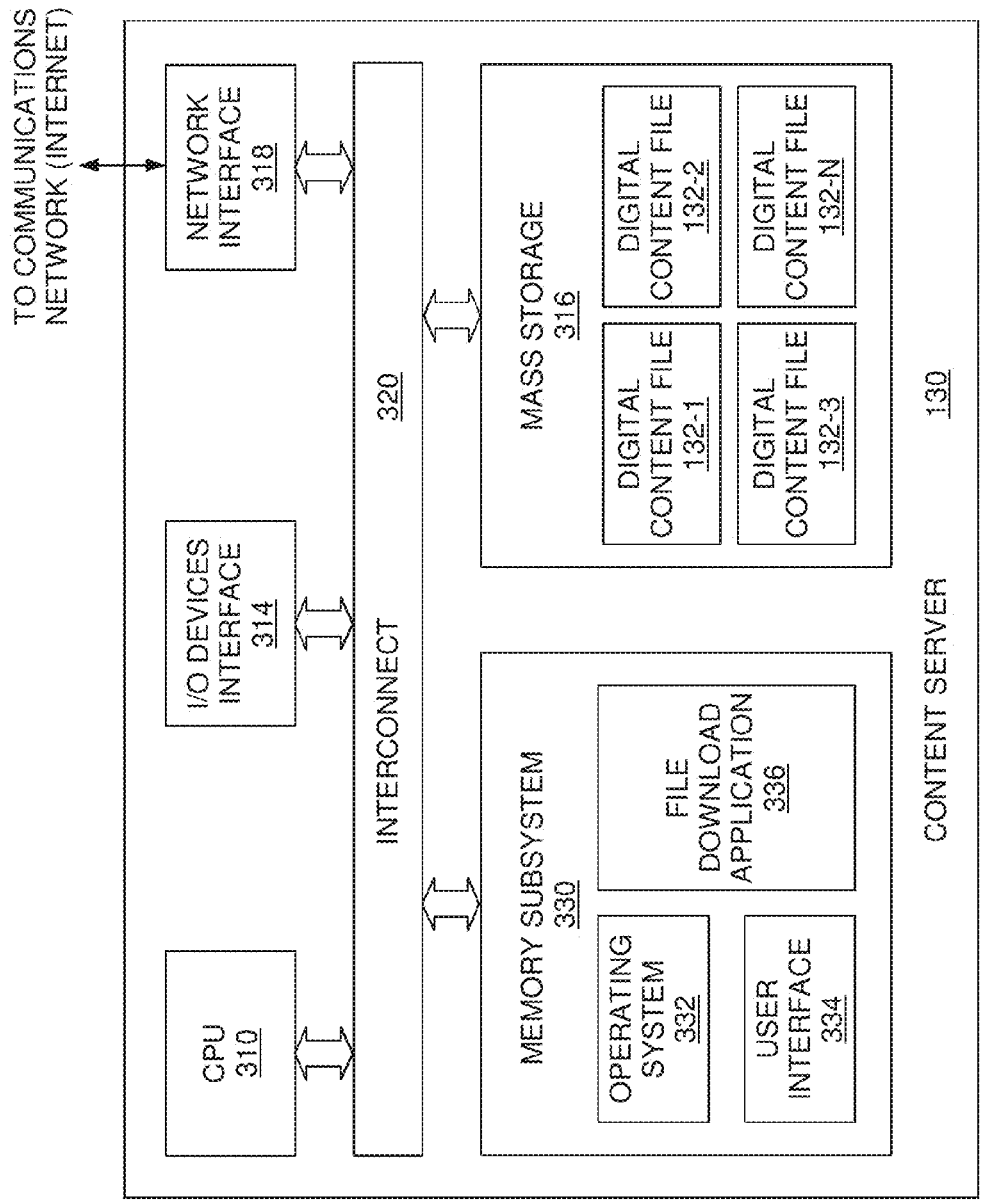
FIG. 3 is a more detailed view of the content server of FIG. 1, according to one embodiment described herein.

FIG. 3 is a more detailed view of the content server 130 of FIG. 1, according to one embodiment of the invention. The content server 130 includes, without limitation, a central processing unit (CPU) 310, a network interface 318, an interconnect 320, a memory subsystem 330, and a mass storage unit 316. The content server 130 may also include an I/O devices interface 314.

The CPU 310 is configured to retrieve and execute programming instructions stored in the memory subsystem 330. Similarly, the CPU 310 is configured to store and retrieve application data residing in the memory subsystem 330. The interconnect 320 is configured to facilitate transmission of data, such as programming instructions and application data, between the CPU 310, I/O devices interface 314, mass storage unit 316, network interface 318, and memory subsystem 330.

The mass storage unit 316 stores digital content files 132-1 through 132-N. The digital content files 132 may be stored using any technically feasible file system on any technically feasible media. For example the mass storage unit 316 may comprise a redundant array of independent disks (RAID) system incorporating a conventional file system.

The memory subsystem 330 includes programming instructions and data that comprise an operating system 332, a user interface 334, and a file download application 336. The operating system 332 performs system management functions such as managing hardware devices including the network interface 318, mass storage unit 316, and I/O devices interface 314. The operating system 332 also provides process and memory management models for the user interface 334 and the file download application 336. The user interface 334 provides a specific structure, such as a window and an object metaphor or a command line interface, for user interaction with content server 130. A user may employ the user interface 334 to manage functions of the content server. In one embodiment, the user interface 334 presents a management web page for managing operation of the content server 130. Persons skilled in the art will recognize the various operating systems and user interfaces that are well-known in the art and suitable for incorporation into the content player 130.

The file download application 336 is configured to facilitate the transmission of digital content files 132-1 to 132-N, to the content player 110, via a file download operation or set of operations. The downloaded digital content file 132 is transmitted through network interface 318 to the content player 110 via the communications network 150. In one embodiment, file contents of each digital content file 132 may be accessed in an arbitrary sequence. As described, each digital content file 132 includes a sequence header index 114 and an encoded sequence. An encoded sequence provides a full version of digital media content (e.g., video or audio data), encoded to a particular bit rate, and video data associated with the encoded sequence is divided into units of video data. Each unit of video data corresponds to a specific span of playback time and begins with a frame including a sequence header specifying the size and the resolution of the video data stored in the unit of video data.

In an embodiment, multiple parallel network connections may be set up and/or operated to each transmit a part of the video stream over a network. In conjunction with FIG. 1, the multiple parallel network connections may connect the content player 110 to one or more content servers 130, each having the digital content file 132. For example, suppose a dropped packet is detected on one of the multiple parallel network connections. In accordance with the TCP protocol, the packet rate for that particular network connection may be dropped in response to the dropped packet, while the remaining network connections may continue operating at their respective packet rates without any reduction.

Using parallel network connections may decrease startup time and/or increase the amount of data transmitted during the startup time. For example, in accordance with the TCP protocol, a network connection may be established with a slow startup packet rate (e.g., a packet rate used to start transmitting data for a network connection), and gradually increase the packet rate after each round trip time period. Using multiple connections may allow a greater amount of data to be transmitted during the start up phase than with a single connection while the packet rate of each of the multiple connections is being gradually increased after each round trip time period.

Using parallel network connections may improve the packet rate for transmitting a video stream in accordance with the TCP protocol. To illustrate, if one network connection is allocated for transmitting a video stream and another network connection is allocated for downloading a file, then the available bandwidth may be divided equally between the two network connections. On the other hand, if multiple (e.g., two) network connections are allocated for transmitting a video stream, and one network connection is allocated for downloading a file, then the video stream may be allocated more (e.g., twice as much) bandwidth as the file download, resulting in an improved packet rate for transmitting the video stream.

In an embodiment, pipelining may be used to transmit a video stream. Pipelining for a network connection may correspond to a process of sending multiple requests to transmit data on the network connection without waiting to receive a response for each of such requests before sending a subsequent request. Pipelining may improve data transmission rates, since gaps in time between requests may be reduced or eliminated. Pipelining may also reduce the number of TCP packets to be sent over a network and may thus reduce network load.

A network may or may not support pipelining. Parallel network connections used to transmit a video stream without pipelining may encounter idle periods between sending requests and receiving responses to the requests. These idle periods can cause instability in a rate control algorithm that manages requests for the parallel network connections, which may result in packet bursts that can overflow a buffer. If pipelining is used on one or more network paths that don't support pipelining, the connections may be closed immediately or after a delay. Although connections may be reopened, time and computing resources may be used that would not have been if the connection had remained open.

The number of closed connections may be compared to a predetermined number. If the number of closed connections is higher than the predetermined number (e.g., an anticipated number of closed connections), then pipelining may be determined not to be supported. If the number is lower, then pipelining may still be supported. In some embodiments, the average number of successful requests per connection may be evaluated to determine whether pipelining is supported. If the average number of requests per connection is below a threshold anticipated number, this may be an indication that pipelining is not supported. For example, a CDN may permit approximately 100 successful requests per connection. If the average number of successful requests per connection is lower than 10 and is not caused by deliberate closure of the connection, the system may determine that pipelining is not supported for the path of the evaluated connection.

In an embodiment, whether support exists for pipelining may be tested by sending a first pair of requests for one or more of the parallel network connections. Throughout this disclosure, each of the parallel network connections used to transmit a pair of requests for testing purposes is broadly referred to as a tested network connection. Requests for each of the tested network connections may be sent back-to-back (e.g., within a predetermined time period, without intervening requests being sent or responses being received). In addition, the requests may be sent in the same or different packets. The responses to the first pair of requests may indicate whether pipelining is supported, possibly supported, or not supported for the corresponding network connection. Some example responses are illustrated in the table below.

TABLE 1

| | 2nd Request Response | | | | | |
|---|---|---|---|---|---|---|
| 1st Request Response | Timeout | Protocol Error | Connection Reset | HTTP 1.0 Response | 2/3/4XX Responses | 5XX Responses |
| Timeout | Maybe | n/a | n/a | n/a | n/a | n/a |
| Protocol Error | n/a | No | n/a | n/a | n/a | n/a |
| Connection Reset | n/a | n/a | Maybe | n/a | n/a | n/a |
| HTTP 1.0 Response | No | No | No | No | No | No |
| 2/3/4XX Responses | No | No | Maybe | No | Yes | No |
| 5XX Responses | No | No | No | No | No | No |

As illustrated in Table 1, responses to the first and second requests may be a timeout, a protocol error, a connection reset, or a response such as a status code. Depending on the responses to the first request and the second request, pipelining may be determined to be supported, possibly supported, or not supported. For example, if the first request response and the second request response both correspond to a predetermined status code (e.g., "2/3/4XX Responses" in Table 1), then pipelining is supported. If the first request/response and the second request/response both correspond to "Timeout" in Table 1, then pipelining may possibly be supported. If the first request response corresponds to "Connection Reset" in Table 1 and the second request response corresponds to "HTTP 1.0 Response" in Table 1, then pipelining is not supported.

Moreover, if pipelining is possibly supported, a third request and a fourth request may be sent to obtain a second result. Based on the combination of the first result and the second result, a determination may be made as to whether pipelining is supported as shown in Table 2 below.

TABLE 2

| First Result | Second Result | Conclusion |
|---|---|---|
| No | — | No |
| Yes | — | Yes |
| Maybe | Yes | Yes |
| Maybe | Maybe | No |
| Maybe | No | No |

Figure 4:
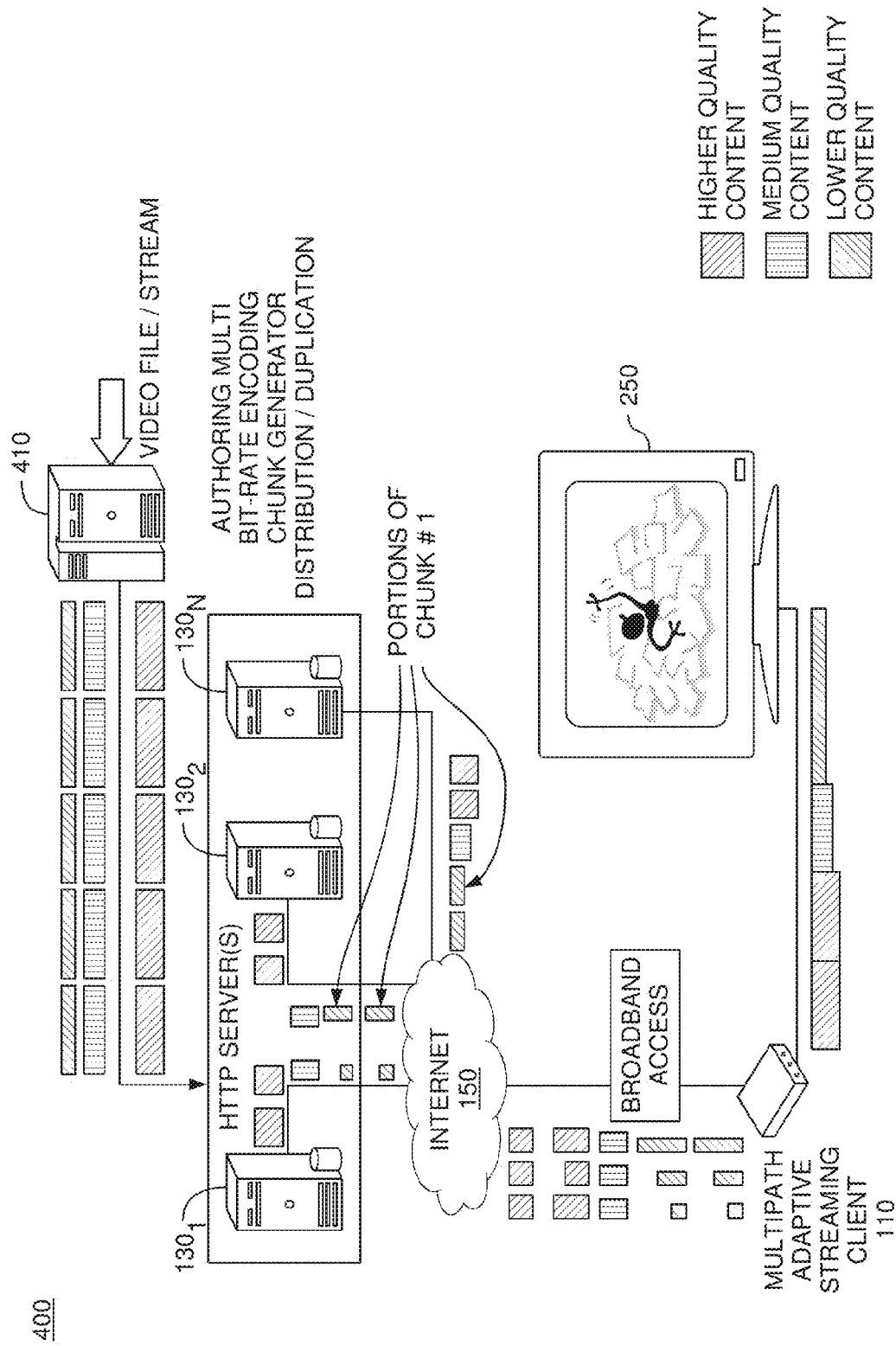
FIG. 4 is a content distribution system configured to implement one or more aspects described herein.

FIG. 4 illustrates a content distribution system configured to implement one or more aspects described herein. As shown, the system 400 includes a content authoring server 410 coupled to a plurality of content servers $130_{1-N}$, which are in turn connected to a multipath adaptive streaming client device 110 via the internet 150. Additionally, the multipath adaptive streaming client device 110 is connected to a display device 250, to which the multipath adaptive streaming client device 110 outputs streaming digital content for display. While the multipath adaptive streaming client device 110 is connected to the plurality of content servers $130_{1-N}$ via the internet 150 in the depicted embodiment, such an illustration is without limitation and is provided for illustrative purposes only. Rather, the multipath adaptive streaming client device 110 may connect to the plurality of content servers $130_{1-N}$ over a variety of network connections (e.g., a local area network, an intranetwork, etc.) and/or combinations of network connections (e.g., a first network connection over the Internet and a second network connection over a local area network). More generally, the multipath adaptive streaming client device 110 can use any technique for connecting to the content servers $130_{1-N}$ consistent with the functionality described herein.

As shown in FIG. 4, the content authoring server 410 provides digital content to each of the plurality of content servers $130_{1-N}$. For purposes of the current example, assume that the content authoring server 410 provides mirror copies of the digital content to each of the plurality of content servers $130_{1-N}$. That is, each of the plurality of content servers $130_{1-N}$ is provided with a full and complete copy of the digital content. More generally, however, it is broadly contemplated that some or all of the plurality of content servers $130_{1-N}$ could be provided with only a portion of the digital content, rather than the entirety of the digital content. For instance, some of the content servers $130_{1-N}$ could only be provided with certain instances of (e.g., certain movies) and/or certain encodings (e.g., high resolution encodings, low resolution encodings, etc.) of a plurality of digital content instances. In such an embodiment where a particular instance of digital content is hosted on only a subset of the plurality of content servers $130_{1-N}$, the multipath adaptive streaming client device 110 may be configured to stream the particular instance of digital content from only the subset of content servers. As another example, some of the content servers $130_{1-N}$ could only be provided with a portion of a particular instance and/or particular encoding of digital. In short, it is broadly contemplated that each of the plurality of content servers $130_{1-N}$ may (or may not) have a full and complete copy of each instance of digital content at every supported encoding rate.

In the reference example of FIG. 4, the content authoring server 410 provides several different encodings of the digital content to the plurality of content servers $130_{1-N}$. More specifically, the digital content is available in three different encodings: a higher quality encoding, a medium quality encoding and a lower quality encoding. Of course, such encodings are without limitation and are shown for illustrative purposes only, and one of ordinary skill in the art will quickly recognize that any number of different encodings may be provided at any number of various encoding rates.

Generally, the multipath adaptive streaming client 110 is configured retrieve a digital content stream from the content servers $130_{1-N}$ through the network 150. For instance, a playback application 236 on the multipath adaptive streaming client 110 could retrieve network performance information for the plurality of content servers $130_{1-N}$. As discussed above, the network performance information can be any qualitative and/or quantitative information of network performance as measured by the client 110.

The playback application 236 maps the content servers to portions of the content buffer on the multipath adaptive content player 110, based on the retrieved network performance information. For instance, the playback application 236 could divide the content buffer on the content player 110 into the plurality of portions and, for each of the plurality of portions of the content buffer, could determining a size of the portion based on the retrieved network performance information for the corresponding content server. For example, the playback application 236 could divide the content buffer into portions such that a first content server having slower network performance, as indicated by the network performance information, is mapped to a later portion of the content buffer, and a second content servers having faster network performance, as indicated by the network performance information, is mapped to an earlier portion of the content buffer. As the playback application 236 is configured to playback content in the content buffer in a chronological order, the first content server having the slower network performance is given more time to transmit its content to the content player 110 (i.e., because the first content server is mapped to the later portion of the content buffer), thereby helping to prevent disruptions in the playback (e.g., disruptions caused by buffer underrun).

Additionally, the playback application 236 could transmit a request to each of the plurality of content servers to transmit digital content associated with the corresponding portion of the content buffer. Advantageously, doing so enables content player devices to stream digital content in parallel from a plurality of different content servers, which in turn may help to maximize the network throughput of the streaming and thereby help to improve the quality of the streaming content (i.e., by streaming a higher quality encoding of the digital content using the increased network throughput). Additionally, mapping later portions of the content buffer to slower content servers and earlier portions of the content buffer to faster content servers more effectively utilizes the content servers of various capabilities. That is, by mapping the content servers to the portions of the content buffer in this fashion, embodiments may prevent interruptions in the digital content stream as the slower content servers will have a long window of time to transmit their corresponding portion of the content buffer (i.e., one of the later portions of the content buffer).

In one embodiment, the playback application 236 optimizes a number of parallel network connections for a digital content stream through the network 150 between a plurality of content servers $130_{1-N}$ and the multipath adaptive streaming client 110. Here, the playback application 236 could determine an indication of network performance for each of the plurality of parallel network connections. Additionally, the playback application 236 could determine whether a first one the plurality of parallel network connections is underperforming, based on whether the indication of network performance associated with the first parallel network connection exceeds a threshold value of performance. In such cases, the playback application 236 could drop or close the first parallel network connection.

Additionally, the playback application 236 could add a new network connection to one of the content servers $130_{1-N}$ under certain circumstances. For instance, in one embodiment, the playback application 236 adds a new network connection if a total network throughput is less than a threshold amount. As an example, the playback application 236 could be preconfigured with an optimal level of network throughput and if the current network throughput for the digital content stream is less than the optimal level of network throughput, the playback application 236 could add an additional network connection to one of the content servers $130_{1-N}$. In one embodiment, the additional network connection is to one of the content servers $130_{1-N}$ to which the playback application 236 does not currently have an existing network connection. Alternatively, the playback application 236 could create an additional network connection to one of the content servers $130_{1-N}$ to which the playback application 236 already has an existing network connection. Advantageously, adding additional connections in this way optimizes the number of parallel network connections used by the content player so that an optimal amount of network throughput can be attained for streaming digital content.

In a particular embodiment, the playback application 236 is configured to add an additional network connection to one of the plurality of content servers $130_{1-N}$ upon determining that a first deadline for the digital content stream will not be met. For instance, if the playback application 236 determines that a portion of the content buffer requested from a first one of the content servers will not be received (from the content server) by the time the playback application 236 reaches that portion of the content buffer (i.e., in playback of the digital content stream), the playback application 236 could add an additional network connection to one of the plurality of content servers $130_{1-N}$ in order to obtain the portion of the content buffer more quickly. As an example, the playback application 236 could be configured to divide the portion of the content buffer into two or more sub-portions and could request content associated with each sub-portion of the content buffer from a different one of the content servers $130_{1-N}$. As a second example, upon determining that the deadline for the portion of the content buffer will not be met, the playback application 236 could request content associated with the portion of the content buffer from a different one of the plurality of content servers $130_{1-N}$. Advantageously, doing so helps to ensure that all deadlines will be met for the digital content stream and helps to prevent interruptions in the playback of the digital content stream.

Additionally, the playback application 236 could add connect to an additional content server $130_{1-N}$ if a count of parallel network connections is fewer than a threshold amount of network connections. That is, the playback application 236 could be preconfigured with an optimal minimum number of network connections and, if the current number of connections is less than the optimal number of network connections, the playback application 236 could add an additional network connection to one of the plurality of content servers $130_{1-N}$. In doing so, the playback application 236 could determine one or more of the content servers $130_{1-N}$ from which a network connection was recently dropped (i.e., due to the network connection underperforming with respect to the digital content stream) and could ensure that the additional network connection is to one of the content servers $130_{1-N}$ that is not one of the one or more recently dropped content servers. That is, the playback application 236 could avoid reestablishing the new connection with one of the recently dropped content servers $130_{1-N}$. Advantageously, doing so helps to ensure that the playback application 236 maintains a minimum number of network connections to the plurality of content servers $130_{1-N}$.

Figure 5:
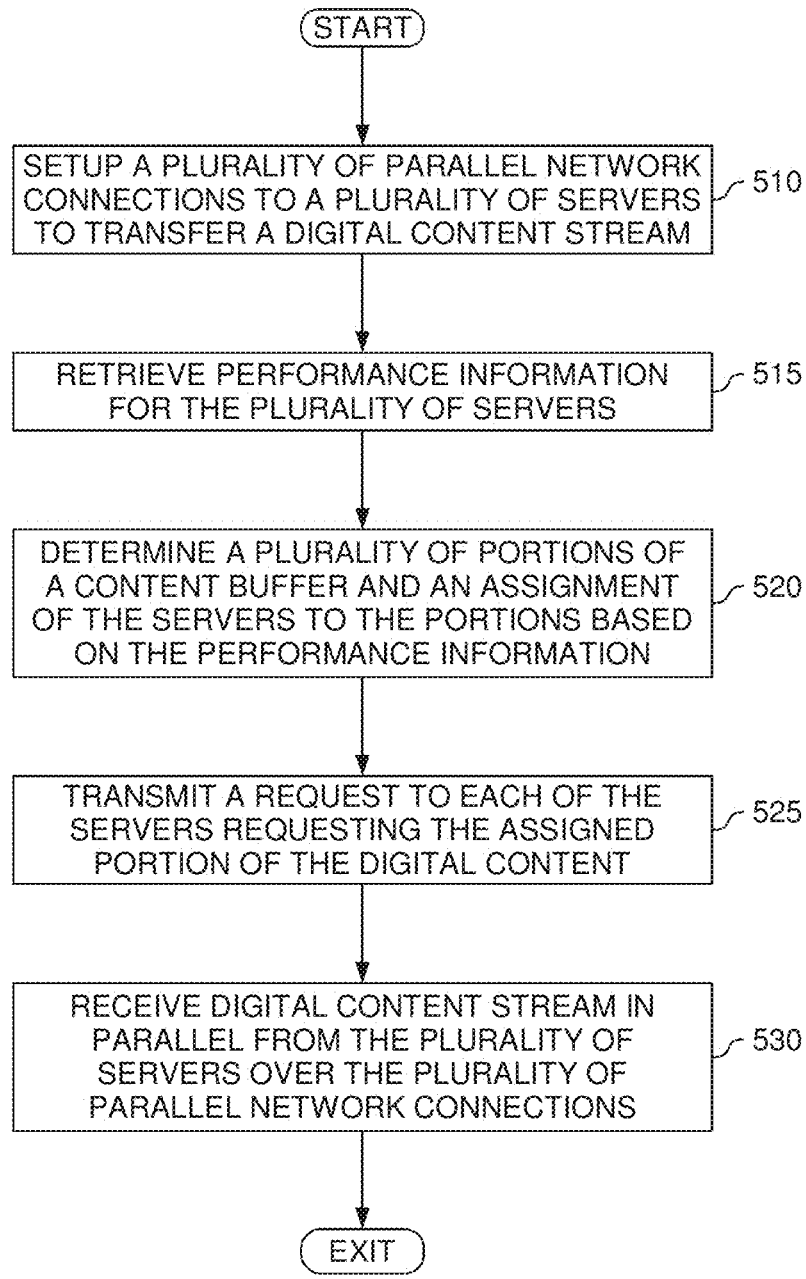
FIG. 5 is a flow diagram illustrating a method for streaming digital content from a plurality of content servers, according to one embodiment described herein.

FIG. 5 illustrates a method for streaming digital content from a plurality of content servers, according to one embodiment described herein. As shown, the method 500 begins at block 510, where a playback application 236 establishes a plurality of parallel network connections to a plurality of content servers for the purpose of transferring a digital content stream. The playback application 236 retrieves performance information relating to the plurality of content servers (block 515). As discussed above the performance information could include any qualitative or quantitative information regarding historical network performance for the content servers, including a measure of network throughput for a content server, network bandwidth for the content server, network throughput variance for the content server, average latency of the content server, historical availability of the content server and services supported by the content server.

The playback application 236 determines a plurality of portions of a content buffer and an assignment of the content servers to the portions of the content buffer, based on the retrieved performance information (block 520). In doing so, the playback application 236 may determine the relative size of each of the portions of the content buffer based on the performance information for the content servers. For example, the playback application 236 could determine that network connections to a first content server historically have a high level of network throughput. Based on this, the playback application 236 could assign a relatively large portion of the content buffer to the first content server, based on the server's historical high levels of network throughput. Continuing the example, the playback application 236 could determine that network connections to a second content server historically have a low level of network throughput and/or frequently experience problems which cause delays to the digital content stream (e.g., packet loss). Based on this, the playback application 236 could assign a relatively small portion of the content buffer to the second content server, to ensure that the second content server is able to transmit the digital content corresponding to the portion of the content buffer in time (i.e., before the playback of the digital content stream reaches the portion of the content buffer).

Additionally, the playback application 236 may determine the mapping of the content servers to the portions of the content buffer based on the retrieved performance information. For instance, continuing the above example, the playback application 236 could map the first content server (i.e., a content server having historically high levels of network throughput) to an earlier portion of the content buffer (i.e., a portion of the content buffer that will be output for display in a shorter amount of time) and could map the second content server (i.e., a content server having historically low levels of network throughput and/or experienced problems which caused delays to the digital content stream) to a later portion of the content buffer. Advantageously, doing so enables the playback application 236 to effectively utilize content servers with differing levels of performance and to do so in such a way that minimizes interruptions to the playback of the digital content stream.

In method 500, the playback application 236 transmits a request to each of the content servers requesting digital content corresponding to the assigned portion of the content buffer (block 525). In response, the content servers 130$_{1-N}$ could transmit the requested digital content, which is in turn received by the playback application 236 running on the content player 110 (block 530), and the method 500 ends. The playback application 236 could insert the received digital content into the content buffer and subsequently output frames corresponding to the received digital content for display (e.g., using a display device 250).

Figure 6:
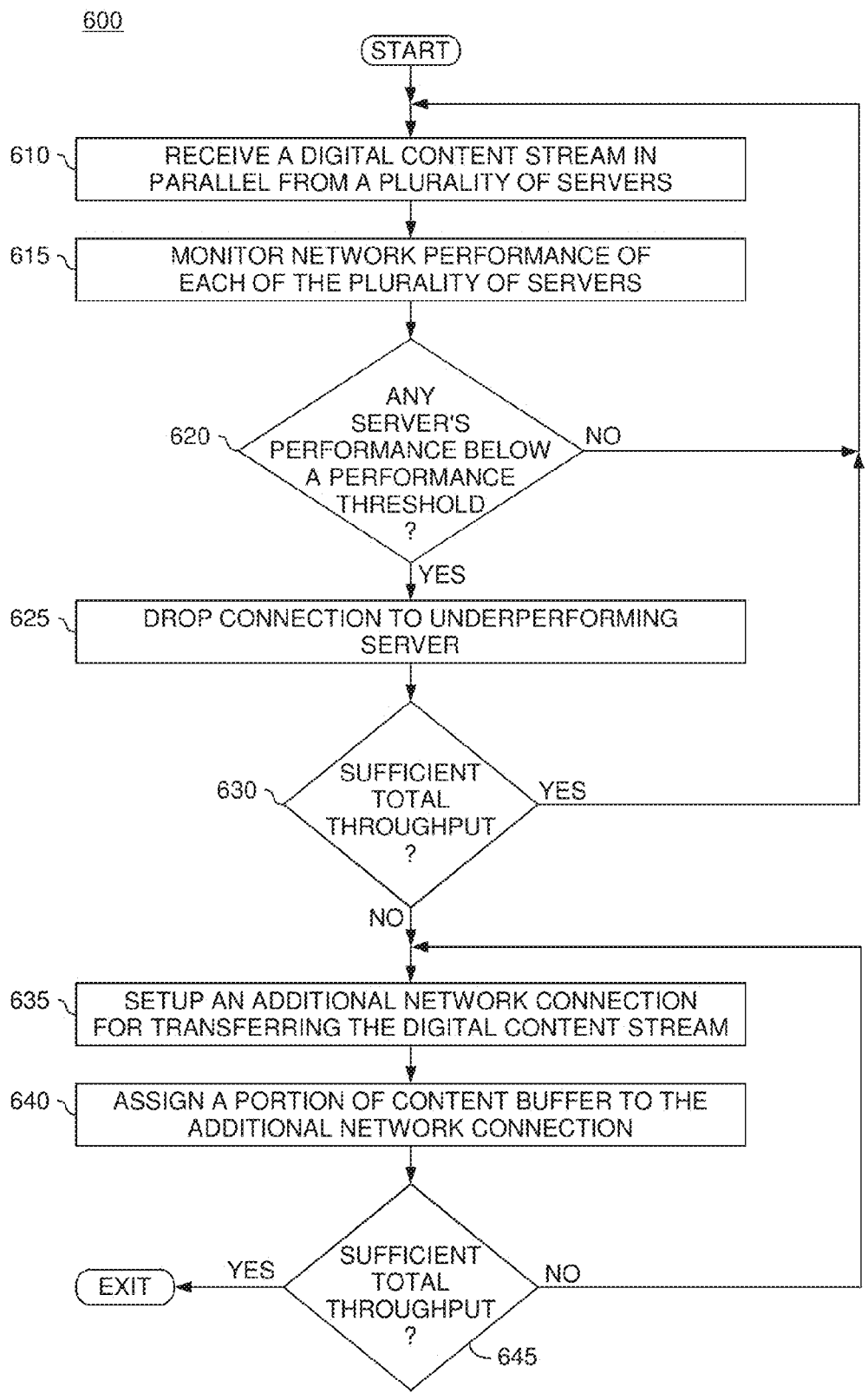
FIG. 6 is a flow diagram illustrating a method for optimizing a number of parallel connections to a plurality of content servers, according to one embodiment described herein.

FIG. 6 illustrates a method 600 for optimizing a number of parallel connections to a plurality of content servers, according to one embodiment described herein. As shown, the method 600 begins at block 510, where a playback application 236 receives a digital content stream from a plurality of content servers using a plurality of parallel network connections. The playback application 236 then monitors the network performance of each of the plurality of content servers (block 615). For instance, the playback application 236 could monitor the network throughput of each of the network connections. As another example, the playback application 236 could monitor the network connections to detect problems in the network connections (e.g., packet loss, connection instability, etc.).

In the depicted embodiment, the playback application 236 next determines whether any of the content server's network performance falls below a threshold level of performance (block 620). If none of the content servers are performing under the threshold level of performance, the method 600 returns to block 610, where the playback application 236 continues receiving streaming digital content from the plurality of content servers. If instead the playback application 236 determines that one or more of the content servers are underperforming, the playback application 236 drops the network connection to the underperforming content server(s) (block 625).

The playback application 236 then determines whether the remaining total network throughput is sufficient for the digital content stream (block 630). If the remaining throughput is determined to be sufficient, the method 600 returns to block 610, where the playback application 236 continues receiving streaming digital content from the plurality of content servers. If instead the playback application 236 determines the remaining total network throughput is insufficient for the digital content stream, the playback application 236 establishes an additional network connection for streaming the digital content (block 635). Such an additional network connection could be, for instance, a network connection to a different one of the plurality of content servers or could alternatively be an additional network connection to one of the content servers to which the playback application 236 has already established a network connection.

The playback application 236 then assigns a portion of the content buffer to the additional network connection (block 640). For instance, the playback application 236 could assign the portion of the content buffer previously assigned to the underperforming content server to the additional connection. In one embodiment, the playback application 236 is configured to reconfigure the content buffer into a plurality of portions (of potentially different sizes from the original allocation) and to reconfigure the mappings of the content servers to the portions of the content buffer.

Once the additional network connection is established, the playback application 236 determines whether the network throughput with the additional network connection is sufficient for the digital content stream (block 645). If the playback application 236 determines the current network throughput is insufficient, the method 600 returns to block 635, where the playback application 236 establishes an additional network connection to one of the plurality of content servers. If instead the playback application 236 determines the current network throughput is sufficient, the method 600 ends.

Embodiments described herein may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user could interact with a playback application 236 running on a content player device in order to initiate a digital content stream from a plurality of content servers hosted within a cloud. For example, the playback application 236 could retrieve network performance information for the plurality of content servers. The playback application 236 could then determine a mapping of the plurality of content servers to a plurality of portions of a content buffer on the content player, based on the retrieved network performance information, and could transmit a request to each of the plurality of content servers to transmit digital content associated with the corresponding portion of the content buffer. Doing so allows the user to stream the digital content hosted on the plurality of content servers from any playback device attached to a network connected to the cloud (e.g., the Internet).

In the foregoing description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Additionally, while the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

Therefore, the scope of the present invention is determined by the claims that follow.

We claim:

1. A method of receiving a digital content stream from a plurality of content servers via a content player, comprising:
retrieving network performance information for each of the plurality of content servers;
dividing a content buffer on the content player into a plurality of portions;
mapping, by operation of one or more processors, each of the plurality of content servers to one of the plurality of portions of the content buffer;
for each of the plurality of portions of the content buffer, determining a size of the portion based on the network performance information associated with the content server corresponding to the portion;
transmitting a request to each of the plurality of content servers to transmit digital content; and
storing digital content received from each of the plurality of content servers in the portion of the content buffer corresponding to the content server.

2. The method of claim 1, wherein content servers with a slower network performance, as indicated by the network performance information, are mapped to later portions of the content buffer, and wherein content servers with a faster network performance, as indicated by the network performance information, are mapped to earlier portions of the content buffer.

3. The method of claim 1,
wherein content servers with a slower network performance, as indicated by the network performance information, are mapped to smaller portions of the content buffer, and wherein content servers with a faster network performance, as indicated by the network performance information, are mapped to larger portions of the content buffer.

4. The method of claim 1, further comprising communicating with the plurality of content servers to set up a plurality of parallel network connections on the network between the plurality of content servers and the content player to transmit the digital content stream.

5. The method of claim 1, further comprising:
monitoring network performance of a first one of the plurality of content servers while the first content server is transmitting digital content to the content player; and
updating the network performance information for the first content server.

6. The method of claim 1, wherein the network performance information specifies at least one of network throughput for a content server, network bandwidth for the content server, network throughput variance for the content server, average latency of the content server, historical availability of the content server and services supported by the content server.

7. A non-transitory computer-readable medium containing a program that, when executed, performs an operation for receiving a digital content stream from a plurality of content servers via a content player, comprising:
retrieving network performance information for each of the plurality of content servers;
dividing a content buffer on the content player into a plurality of portions;
mapping, by operation of one or more processors, each of the plurality of content servers to one of the plurality of portions of the content buffer;
for each of the plurality of portions of the content buffer, determining a size of the portion based on the network performance information associated with the content server corresponding to the portion;
transmitting a request to each of the plurality of content servers to transmit digital content; and
storing digital content received from each of the plurality of content servers in the portion of the content buffer corresponding to the content server.

8. The non-transitory computer-readable medium of claim 7, wherein content servers with a slower network performance, as indicated by the network performance information, are mapped to later portions of the content buffer, and wherein content servers with a faster network performance, as indicated by the network performance information, are mapped to earlier portions of the content buffer.

9. The non-transitory computer-readable medium of claim 7,
wherein content servers with a slower network performance, as indicated by the network performance information, are mapped to smaller portions of the content buffer, and wherein content servers with a faster network performance, as indicated by the network performance information, are mapped to larger portions of the content buffer.

10. The non-transitory computer-readable medium of claim 7, the operation further comprising communicating with the plurality of content servers to set up a plurality of parallel network connections on the network between the plurality of content servers and the content player to transmit the digital content stream.

11. The non-transitory computer-readable medium of claim 7, the operation further comprising:
monitoring network performance of a first one of the plurality of content servers while the first content server is transmitting digital content to the content player; and
updating the network performance information for the first content server.

12. The non-transitory computer-readable medium of claim 7, wherein the network performance information specifies at least one of network throughput for a content server, network bandwidth for the content server, network throughput variance for the content server, average latency of the content server, historical availability of the content server and services supported by the content server.

13. A content player, comprising:
a memory storing a playback application; and
a processor coupled to the memory, wherein, when executed by the processor, the playback application configures the processor to:
retrieve network performance information for each of the plurality of content servers;
divide a content buffer on the content player into a plurality of portions;
map, by operation of one or more processors, each of the plurality of content servers to one of the plurality of portions of the content buffer;
for each of the plurality of portions of the content buffer, determine a size of the portion based on the network performance information associated with the content server corresponding to the portion;

transmit a request to each of the plurality of content servers to transmit digital content; and store digital content received from each of the plurality of content servers in the portion of the content buffer corresponding to the content server.

14. The content player of claim 13, wherein content servers with a slower network performance, as indicated by the network performance information, are mapped to later portions of the content buffer, and wherein content servers with a faster network performance, as indicated by the network performance information, are mapped to earlier portions of the content buffer.

15. The content player of claim 13, wherein content servers with a slower network performance, as indicated by the network performance information, are mapped to smaller portions of the content buffer, and wherein content servers with a faster network performance, as indicated by the network performance information, are mapped to larger portions of the content buffer.

16. The content player of claim 13, the operation further comprising communicating with the plurality of content servers to set up a plurality of parallel network connections on the network between the plurality of content servers and the content player to transmit the digital content stream.

17. The content player of claim 13, the operation further comprising:

monitoring network performance of a first one of the plurality of content servers while the first content server is transmitting digital content to the content player; and updating the network performance information for the first content server.

18. The content player of claim 13, wherein the network performance information specifies at least one of network throughput for a content server, network bandwidth for the content server, network throughput variance for the content server, average latency of the content server, historical availability of the content server and services supported by the content server.

* * * * *